United States Patent [19]

Shapiro et al.

[11] Patent Number: 5,090,127
[45] Date of Patent: Feb. 25, 1992

[54] SAFETY COMPASS

[75] Inventors: Bruce Shapiro, Northbrook; Gunar Narubin, Chicago, both of Ill.

[73] Assignee: Creative Works, L.P., Northbrook, Ill.

[21] Appl. No.: 672,962

[22] Filed: Mar. 21, 1991

[51] Int. Cl.⁵ .................................. G01B 3/16
[52] U.S. Cl. ........................ 33/27.02; 33/558.5
[58] Field of Search ........... 33/558.01, 558.02, 558.03, 33/558.04, 558:05, 558.06, 558.07, 27.02, 27.03, 558.5

[56] References Cited

U.S. PATENT DOCUMENTS

| 730,388 | 6/1903 | Oberbeck | 33/27.02 |
| 854,586 | 5/1907 | Mayer | 33/558.5 |
| 2,582,585 | 1/1952 | DeCesaris | 33/27.02 |
| 4,104,801 | 8/1978 | Payton | 33/27.02 |

FOREIGN PATENT DOCUMENTS 2740 of 1894 United Kingdom ............. 33/558.01

Primary Examiner—Harry N. Haroian
Attorney, Agent, or Firm—Dressler, Goldsmith, Shore, Sutker & Milnamow, Ltd.

[57] ABSTRACT

A safety compass comprising first and second leg members. The leg members have a pivot opening and an arcuate slot formed in an upper portion thereof. The upper end portion of the leg members are pivotally attached together by a handle member having a pair of spaced apart side leaves that receive the upper end portions of the leg members therebetween. The leaves have horizontally aligned pivot openings and substantial vertical slots formed therein. A pivot pin member extends through the pivot openings formed in the leaves and the leg members. A guide pin member extends into and moves within the slots formed in the leg members and the leaves. A unique means is provided to retain a drawing implement. All of the component parts are preferably fabricated from a plastic material.

5 Claims, 2 Drawing Sheets

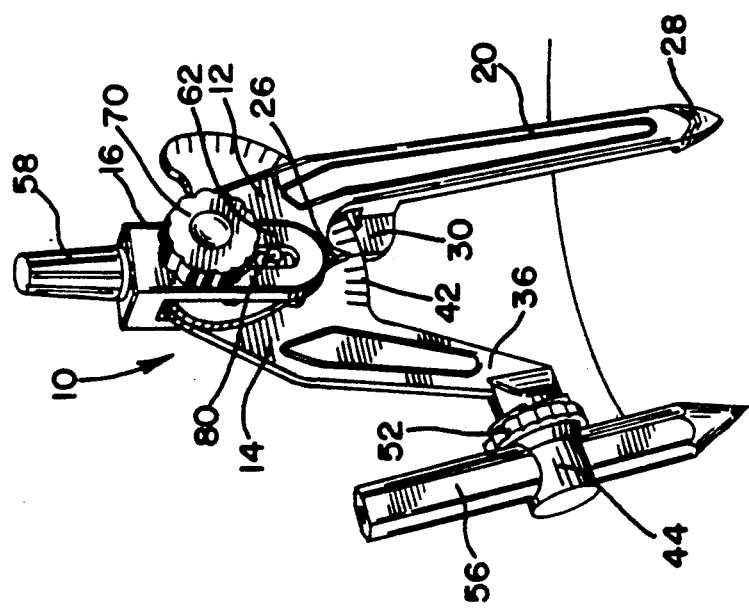
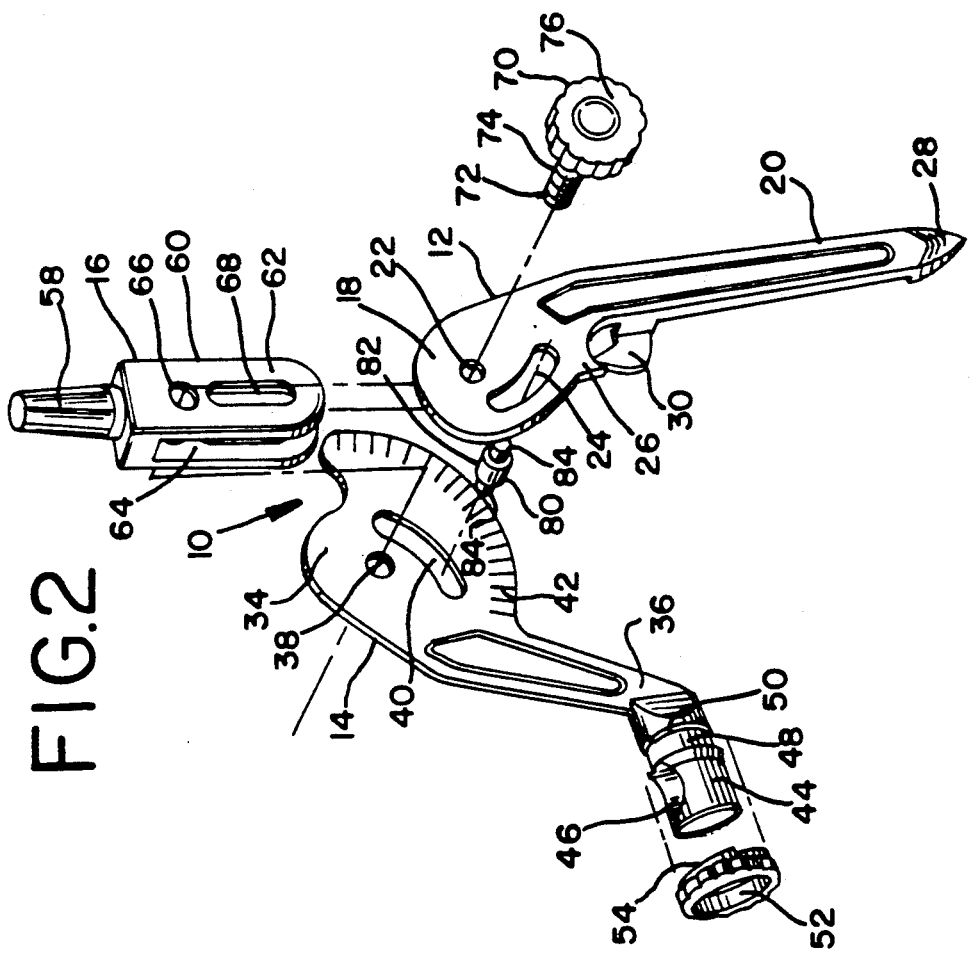

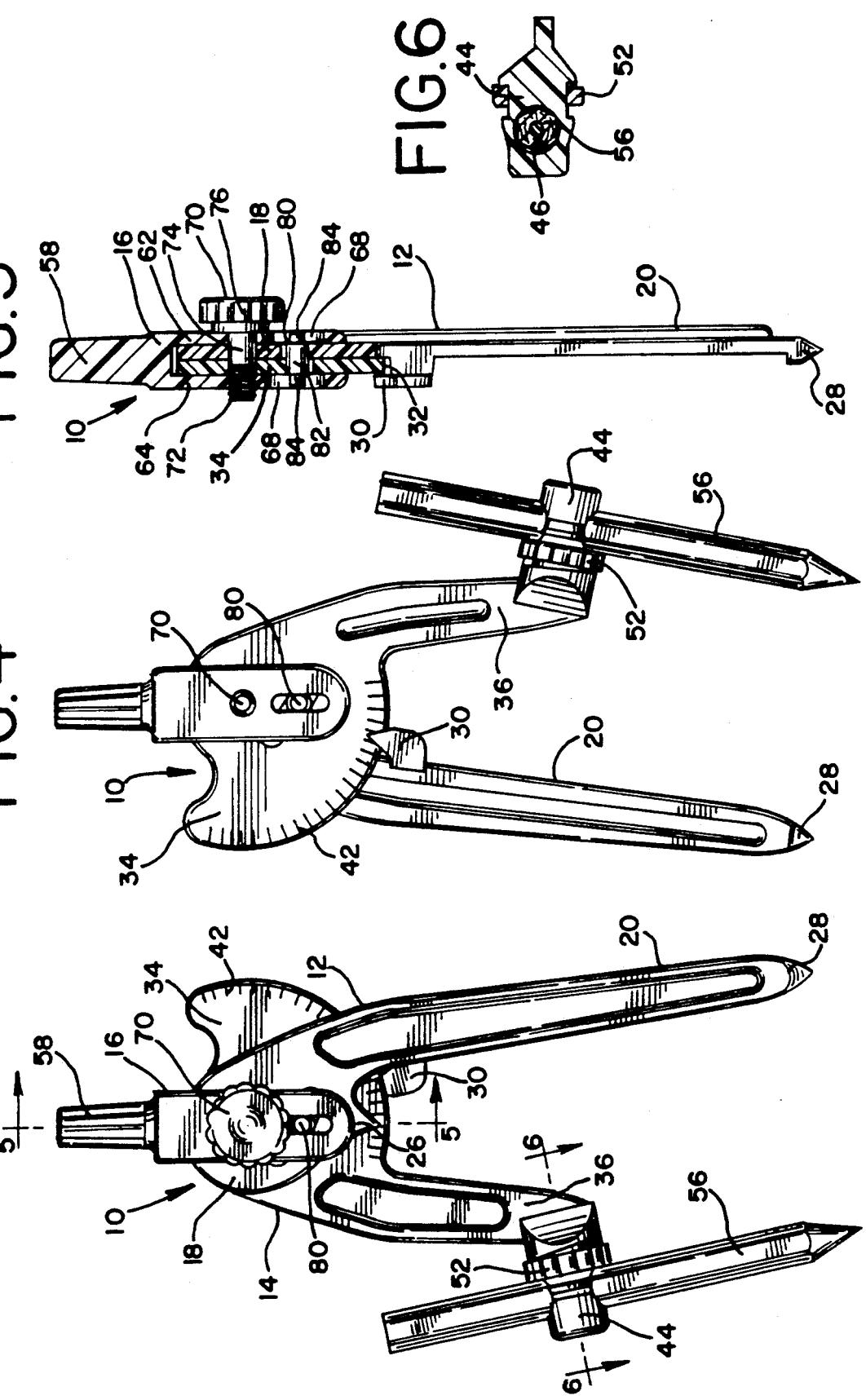

SAFETY COMPASS

BACKGROUND OF THE INVENTION

The invention relates generally to a compass and more specifically to a compass that is designed to be safely used by school age children.

Typically compasses used by children in school are made of metal and have a very sharp point formed at the end of one of the legs of the compass. Such compasses have posed a safety hazard during normal handling of the device and are prone to dangerous misuse by children.

There is a need for a compass that may be safely used by school age children. There is further a need for a safety compass that may be made entirely from plastic components and yet function in a satisfactory manner.

SUMMARY OF THE INVENTION

The compass of the present invention comprises first and second leg members. The leg members have an upper portion that has a pivot opening and an arcuate slot formed therein. The lower end portion of the fist leg member has a point formed therein and the lower end portion of the second leg member has a bore formed therein for receipt of a drawing implement therethrough. The upper end portion of the leg members are pivotally attached together by a handle member having an upper handle portion and a lower clamping fork portion. The fork portion includes a pair of spaced apart side leaves that receive the upper end portions of the leg members therebetween. The leaves have horizontally aligned pivot openings and substantially vertical slots formed therein that are horizontally aligned.

A pivot pin member extends through the pivot openings formed in the leaves and in the leg members. A guide pin member extends into and moves within the slots formed in the leg members and the leaves so as to cause the handle portion to retain a substantially vertical orientation during pivotal movement of the leg members. The pivot pin member selectively clamps the leg members and the leaves in a fixed position.

In accordance with a preferred embodiment of the invention the drawing implement receiving bore is formed through a substantially cylindrical portion associated with a lower portion of the second leg member. A retaining ring member is received in a recess formed in the cylindrical portion that extends beyond a portion of the bore. The retaining ring member and a surface of the recess are formed with cooperating cam surfaces such that rotation of the ring member causes it to contact and clamp the drawing implement in a fixed position within the bore.

All of the component parts of the safety compass are made of a plastic material.

DESCRIPTION OF THE DRAWINGS

A preferred embodiment of the invention is illustrated in the accompanying drawings, in which:

FIG. 1 is a perspective view of a safety compass constructed in accordance with the invention;

FIG. 2 is an exploded perspective view showing the component parts of the safety compass shown in FIG. 1;

FIG. 3 is a front elevational view of the safety compass shown in FIG. 1;

FIG. 4 is a rear elevational view of the safety compass shown in FIG. 1;

FIG. 5 is a sectional view taken along line 5—5 in FIG. 3; and

FIG. 6 is a sectional view taken along line 6—6 in FIG. 3.

DESCRIPTION OF A PREFERRED EMBODIMENT

Referring to FIGS. 1-6, a safety compass constructed in accordance with the invention is indicated generally at 10. Compass 10 comprises a first leg member 12, a second leg member 14, and a handle member 16.

First leg member 12 has an upper end portion 18 and a lower end portion 20. The upper end portion 18 is generally flat and is formed with a pivot opening 22 and an arcuate slot 24 formed therein. Upper end portion 18 also has a first indicator portion 26 integrally formed therewith. The lower end portion is formed so as to define a blunt point portion 28. A second indicator portion 30 is formed integrally with and extends inwardly from an intermediate portion of leg member 12 so as to define a cut-out portion 32.

Second leg member 14 has an upper end portion 34 and a lower end portion 36. The upper end portion 34 is generally flat and is formed with a pivot opening 38 and an arcuate slot 40 formed therein. Arcuate slots 24 and 40 are inclined in opposite directions, as best seen in FIG. 2. The front and rear surfaces of portion 34 are provided with radii indicia 42 formed therewith that cooperate with a corresponding indicator 26 or 30 to designate the radius of the circle being drawn by the compass. The indicia on one surface is preferably in inches and on the other surface in centimeters. The lower end portion 36 is formed with a generally cylindrical portion 44 having a bore 46 formed therein. A recess 48 is formed in cylindrical portion 44 with a portion thereof extending through a portion of bore 46. Recess 48 is provided with a cam surface 50 spaced from bore 46. A retaining ring 52 is rotatably positioned in recess 48. Ring 52 is formed with a cam surface 54 that contacts and cooperates with cam surface 50 such that rotation of ring 52 causes the ring 52 to selectively extend around a portion of bore 46 and clamp against drawing implement extending therethrough and thereby retain the implement in place. Rotation of the ring 52 in the opposite direction releases the engagement between the ring 52 and the implement 56 and permits the implement to be adjusted or removed.

Handle member 16 includes an upper knurled handle portion 58 and a lower clamping fork portion 60. Fork portion 60 comprises a pair of spaced apart side leaves 62 and 64 having horizontally aligned pivot openings 66 and substantially vertical elongated slots 8 formed therein.

The upper end portions 18 and 34 are sandwiched between leaves 62 and 64 and a pivot pin member 70 extends through pivot openings 22, 38, and 66. Pivot pin member 70 comprises a threaded end portion 72, a central shank portion 74 and a knob end portion 76. Threaded end portion 72 is threadedly received by cooperating threads formed in at least one of the openings 66. Leg members 12 and 14 are selectively pivoted about pin member 70 dependant upon the radius of the circle or arc to be drawn by the compass. The leg members are secured in place by rotating pin member 70 to cause it to clamp upper end portions 18 and 34 and the leaves 62 and 64 together in a fixed relationship. Rotation of pin member 70 in the opposite direction releases the clamping of these members and releases the leg members 12 and 14 to be pivoted about pin member 70. Referring to FIG. 5, it should be noted that the portion of upper end portion 34 that includes indicia 42 extends into cut-out portion 32.

A guide pin member 80 is provided to control the relative movement of handle member 16 as leg members 12 and 14 are pivoted about pin member 70. Guide pin member 80 includes a cylindrical central portion 82 and cylindrical end portions 84 that have a diameter less than that of the central portion 82. Central portion 82 preferably has a length that is substantially equal to the combined thicknesses of upper end portions 18 and 34 at arcuate slots 24 and 40. End portions 84 preferably have a length that is substantially equal to the thickness of the corresponding upper end portion 24 or 40. As best seen in FIG. 5, guide pin member 80 is positioned such that central portion 82 is located between the inner facing surfaces of leaves 62 and 64 and end portions 84 extend through a corresponding arcuate slot 24 or 40 and an adjacent elongated slot 68. As leg members 12 and 14 are pivoted relative to one another, the end portions 84 move within the slots 24, 40 and 68 in a manner that causes handle member 16 to maintain a substantial vertical orientation.

In accordance with a feature of the invention, all of the above described component parts of the compass 10 are fabricated from a suitable plastic material.

The invention is not limited to the preferred form of the compass herein shown and described but is intended to include alternative embodiments that come within the spirit and scope of the invention as set forth in the appended claims.

What is claimed is:

1. A compass, comprising:
   a first leg member having an upper end portion and a lower end portion, said upper end portion having a pivot opening and an arcuate slot formed therein, said lower end portion having a point formed therein;
   a second leg member having an upper end portion and a lower end portion, said upper end portion having a pivot opening and an arcuate slot formed therein, said lower end portion having a substantially cylindrical portion having a bore formed therein for receipt of a drawing implement therethrough;
   a handle member having an upper handle portion and a lower clamping fork portion, said clamping fork portion defining a pair of spaced apart side leaves for receipt of the upper end portions of said first and second leg members therebetween, said leaves having horizontally aligned pivot openings formed therein and substantially vertical horizontally aligned elongated slots formed therein;
   a pivot pin member extending through the pivot openings formed in said leaves and said leg members so as to permit the upper portions of said leg members to pivot with respect to one another;
   a guide pin member that extends through and moves within the slots formed in said leg members;
   and a retaining ring member received in a recess formed in said cylindrical portion extending about a portion of said bore, said retaining ring member having a cam surface associated therewith that cooperates with a cam surface of said recess to move said retaining ring member into clamping contact with said drawing implement as said cam surface associated with said retaining ring member is rotated against said cam surface of said recess.

2. The invention as defined in claim 1 wherein said arcuate slots formed in said leg members are oppositely inclined.

3. The invention as defined in claim 1 wherein said pivot pin member has a threaded end portion, a central shank portion and a knob end portion, said threaded end portion being threadedly received in one of said pivot openings so as to selectively clamp said leg members and said leaves in a fixed position as said knob end portion is tightened against the other of said leaves.

4. The invention as defined in claim 1 wherein said guide pin member has a central portion that extends through the slots formed in said first and second leg members and end portions of reduced diameter that extend through the slots formed in said leaves.

5. The invention as defined in claim 1 wherein one of said leg members has radii indicia indicated thereon and the other leg member has a pointer portion associated therewith that cooperates with said radii indicia to indicate the radius of the circle being drawn by the compass.

* * * * *